No. 614,739. Patented Nov. 22, 1898.
R. D. MILLER.
BRINE EVAPORATOR.
(Application filed Feb. 16, 1898.)

(No Model.) 2 Sheets—Sheet 1.

WITNESSES:
William P. Gaebel
H. L. Reynolds

INVENTOR
R. D. Miller
BY Murray
ATTORNEYS.

No. 614,739. Patented Nov. 22, 1898.
R. D. MILLER.
BRINE EVAPORATOR.
(Application filed Feb. 16, 1898.)
(No Model.) 2 Sheets—Sheet 2.
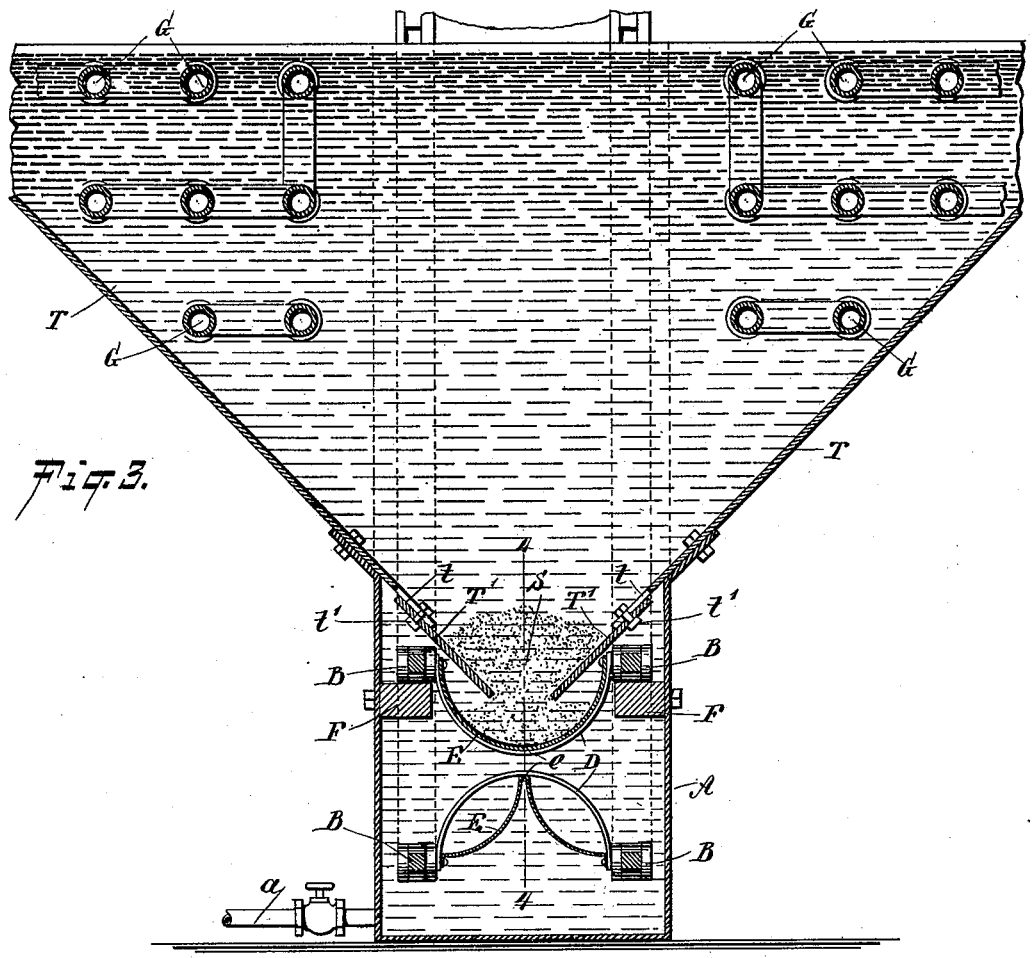
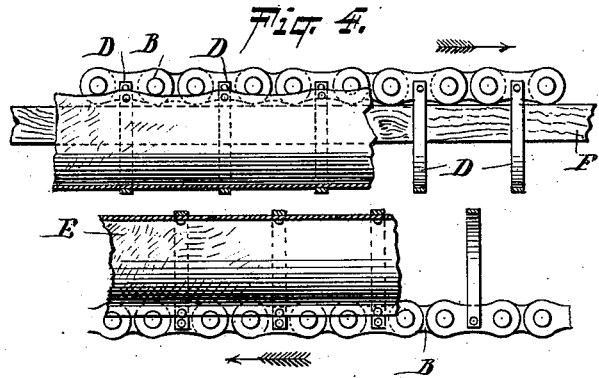
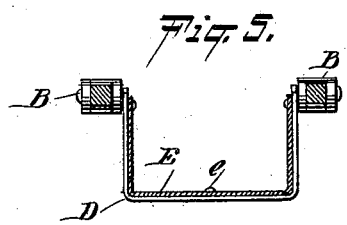
WITNESSES:
William P. Goebel
H. L. Reynolds
INVENTOR
R. D. Miller
BY
ATTORNEYS.

UNITED STATES PATENT OFFICE.

ROBERT D. MILLER, OF WARSAW, NEW YORK.

BRINE-EVAPORATOR.

SPECIFICATION forming part of Letters Patent No. 614,739, dated November 22, 1898.

Application filed February 16, 1898. Serial No. 670,530. (No model.)

*To all whom it may concern:*

Be it known that I, ROBERT D. MILLER, of Warsaw, in the county of Wyoming and State of New York, have invented a new and Improved Brine-Evaporator, of which the following is a full, clear, and exact description.

My invention relates to an improvement in brine-evaporators, and has for its object to render the collection of the salt crystals as formed and the depositing of the same upon a suitable conveyer or within suitable receptacles entirely automatic, dispensing with hand labor therefor.

The invention consists of certain novel features of construction, which will be hereinafter described and claimed.

Reference is to be had to the accompanying drawings, forming a part of this specification, in which similar characters of reference indicate corresponding parts in all the views.

Figure 1:
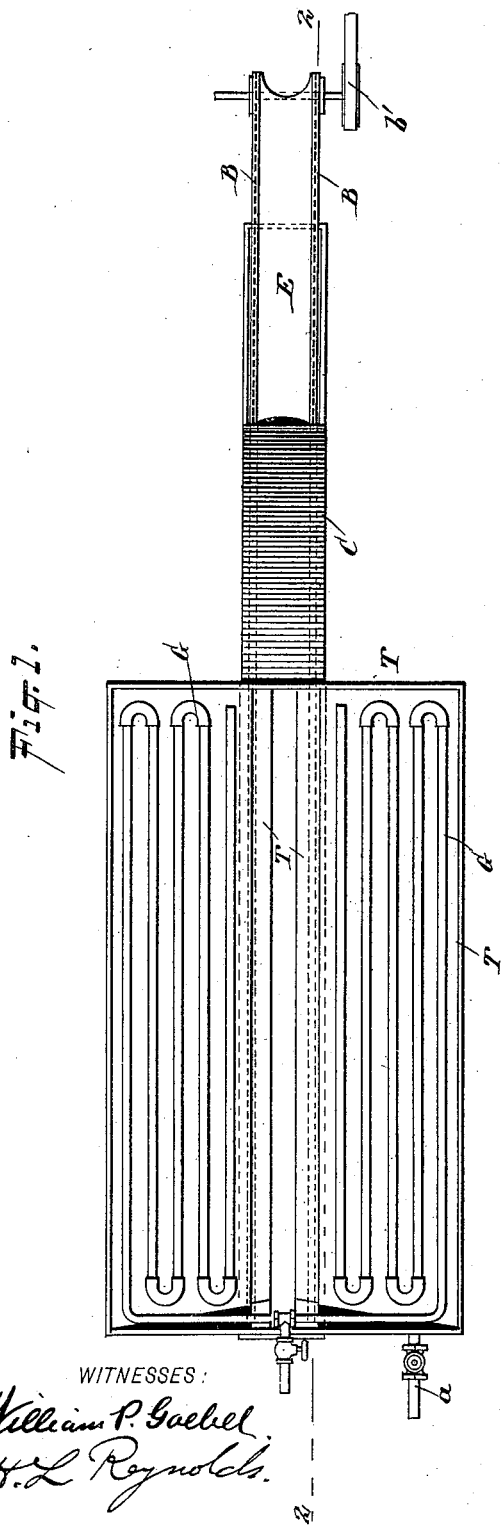
Figure 2:
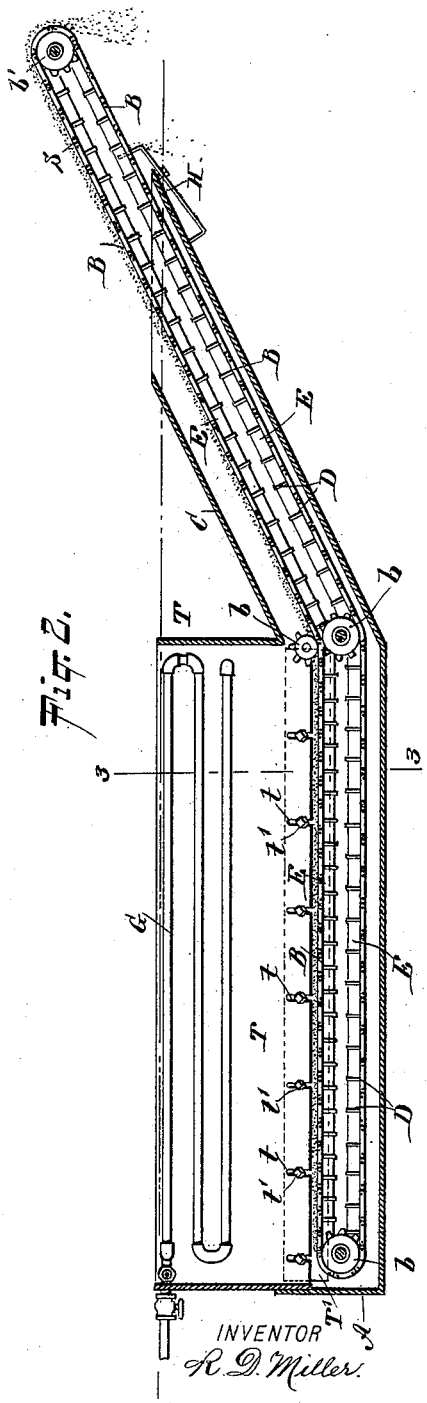

Figure 1 is a top plan view of one of my machines. Fig. 2 is a longitudinal sectional elevation of the same on the line 2 2 in Fig. 1. Fig. 3 is an enlarged cross-sectional elevation on the line 3 3 in Fig. 2. Fig. 4 is a sectional side elevation of a portion of the belt used for collecting the salt crystals on the line 4 4 in Fig. 3. Fig. 5 is a cross-sectional view showing a belt differing slightly in shape from that shown in Fig. 3.

The tank which contains the brine is divided into two parts, the upper part T being a tank having a sloping bottom terminating in an opening communicating with the lower part. The upper part is herein shown as of a V shape, with the bottom sloping from each side to the center, but may be made with vertical sides and with the bottom sloping to one side only, if desired. The material point is the sloping bottom and the opening at the lower part thereof into the lower part of the tank. The lower part A consists of a chamber, which may be of any suitable form and which contains the belt upon which the salt crystals are collected. A convenient form for this lower portion A is a rectangular shape, as shown in the drawings. The two parts of the tank are connected together and are both filled with the brine. The lower portions of the side plates of the upper part T project beyond the edges of the lower part A and are preferably provided with a series of slots $t$, adapted to receive bolts $t'$, by which plates T'' are secured to the bottom of the upper tank, so as to continue the slope thereof nearer to the middle. By reason of the slots $t$ these plates may be adjusted somewhat, and by loosening the bolts the plates may be entirely removed.

The upper tank T is provided with series of steam-pipes G, by which the brine is heated. The brine is fed to the tank by means of a pipe $a$, which preferably enters the lower portion of the lower section A. At one end of the tank is an upwardly-extending inclined chute or tunnel C, which opens into the lower portion A and extends upward until its upper end is above the water-level of the upper tank T. At each end of the lower portion A of the tank are placed shafts, having sprocket-wheels $b$ thereon, adapted to receive an endless chain. Two chains B are placed over these wheels and carried outward through the chute or tunnel C and over the sprocket-wheels $b'$. These chains are parallel to each other and are operated together. Their upper ends extend over sprocket-wheels $b'$, fixed to a shaft outside of the chute C, and return through the same course, the returning half of the chain being beneath and immersed in the brine. As the chain is immersed, except for the short time when passing over the upper sprocket-wheel $b'$, it is not liable to rust or form discolored crystals which will injure the product. The chains B are connected at frequent intervals by bars D, which are curved so as to bring the convex side of the bar toward the opposite side of the chain. This brings the concave side of the bars up for the upper portion of the chain. These chains are supported intermediate the wheels upon guides F.

Upon the bars D and connected to the chain B is placed a belt, preferably formed of canvas or some other material having meshes therein through which the brine may run. This forms a concave trough or belt, which receives the crystals of salt and carries them upward through the chute or tunnel C until they are carried out of the brine. Crystals of salt forming in the upper tank will settle through the brine until they reach the inclined bottom of the upper tank T. They will then slide down this slope until they enter the trough formed by the moving belt E. The upper set of sprocket-wheels, carrying the outer end of this belt, being out of water, the crystals will be freed from the water and be dumped at the end of the belt where it starts to return. Beneath this point is placed some suitable conveyer for removing the salt or cars or similar receptacles for conveying it to the point desired.

The belt E is preferably secured at its edges to the chain and at its center to the center of the stiffening-bars D. These bars or ribs prevent the two chains being drawn together and furnish a support for the belt. As the belt passes the outer sprocket-wheels the canvas will fall down in such a manner as to shake the crystals of salt free. In case, however, that some of them are not freed they will be freed by a scraper H, which is secured to the upper end surface of the chute or tunnel C and consists of a bar of iron or wire bent upon itself, so as to form at the loop end a curve shaped to fit the curve of the belt. This is adjusted so that it will bear upon the lower side of the belt and scrape it free of any remaining crystals.

The brine-feed being introduced at the lower portion of the tank passes upward past the belt E, and thus keeps the brine in the lower portion of the tank less salt than that in the upper portion. This prevents the formation or deposit of salt crystals in the lower portion of the tank.

In Fig. 5 the bars D, connecting the two halves of the chain, are shown as bent in rectangular form. This form may be used, if desired, although the semicircular form is thought preferable. The exact shape of these bars is, however, not considered essential. In fact the bars might be made straight. This would, however, decrease the carrying capacity of the belt, and it is preferable to bend the bars.

It will thus be seen that my machine is entirely automatic in its action, needing only to be furnished with steam for heating the brine and power to turn the belt. If kept supplied with brine, it will then deliver a constant stream of crystals of salt. One man can thus attend to a large plant and the labor cost of making the salt will be much reduced.

Having thus described my invention, I claim as new and desire to secure by Letters Patent—

1. In a brine-evaporator, a tank having inclined plates extending from the sides of the tank downward toward the center and overhanging at their inner edges, two parallel endless chains extending along the bottom of the tank and beneath the overhanging portion of said inclined plates, a belt connected to and extending between the said chains, and guiding-supports for said chains carrying the belt at one point above the tank-level, whereby the salt crystals are collected on the belt and carried out of the water.

2. In a brine-evaporator, a tank constructed in two parts, the upper part having an inclined bottom and the lower part constituting a well extending longitudinally beneath said bottom, the inclined bottom projecting inward beyond the sides of the well, an inclined chute or tunnel extending upward from one end of said well to above the water-level, and an endless belt extending longitudinally of the well and upward through said chute or tunnel to above the water-line.

3. In a brine-evaporator, a tank having at one end a chute or tunnel extending upward to above the water-line, inclined deflector-plates projecting inward from the sides of the tank, an endless belt extending along the bottom of said tank and through said chute or tunnel to above the water-line, and means for operating said belt, whereby the salt crystals are collected on the belt and automatically deposited outside the tank.

4. In a brine-evaporator, a tank having a chute or tunnel extending upwardly from one end to above the water-line of the tank, two parallel endless chains extending along the bottom of the tank and through said chute or tunnel to above the water-line, inclined plates projecting from the sides of the tank over the chains, and a belt connected to and extending between said chains and upon which the salt crystals are collected and by which they are carried outside of the tank.

5. In a brine-evaporator, a tank having an inclined chute or tunnel extending upwardly from one end, two parallel endless chains extending along the bottom of the tank through said chute and beyond the upper end thereof, bars connecting said chains at frequent intervals, a belt connected to said chains and bars, and inclined plates projecting from the sides of the tank over the edges of the belt.

6. A brine-evaporator having a tank provided in its upper portion with an inclined bottom with projecting lower edges, an extension of said tank beneath the projecting lower edges of said inclined bottom forming a well, an inclined chute extending upwardly from one end of the well to the water-level, two parallel endless chains extending along said well and through the chute to above the water-line, bars connecting said chains at frequent intervals, and a belt connected to said chains and bars, the inclined bottom extending over the edges of the belt, whereby the salt crystals are collected upon the belt and conveyed outside of the tank.

7. A brine-evaporator, having a tank with an inclined bottom, an extension of said tank beneath the lower edges of said inclined bottom forming a well, an inclined chute extending upwardly from one end of said well to the water-level of the tank, two parallel endless chains extending along the well and through the chute to above the water-level, a belt connecting said chains, and removable plates attached to the lower edges of the inclined tank-bottom and extending over the edges of the belt.

8. A brine-evaporator, comprising a tank having an endless belt extending along the bottom thereof and upward at one end to above the water-level, inclined plates projecting from the sides of the tank over the edges of the belt, and a brine-feed entering said tank beneath the belt.

9. A brine-evaporator, comprising a tank divided into two portions, the upper portion having an inclined bottom and the lower portion being beneath the projecting lower edges of said bottom, an endless belt extending along the lower portion of said tank beneath said projecting edges and extending upwardly at one end to above the water-level, and a brine-feed discharging into the lower portion of said tank beneath the belt.

10. A brine-evaporator, comprising a tank divided into two parts, the upper part having its bottom inclined toward the center and the lower part or well extending beneath the bottom of said inclines, two parallel endless chains extending through the lower portion of said tank and upward at one end to above the water-level, a belt extending between said chains, plates attached to the lower portions of said inclines and extending over the edges of the belt, and a brine-feed entering the lower portion of the tank beneath said belt.

11. A brine-evaporator, comprising a tank divided into two portions, an upper portion having inclined bottom plates converging toward the center and a lower portion or well projecting beneath the inclined bottom, the lower projecting edges of said inclined plates projecting over the well, an endless belt extending along the lower portion of said tank and beneath said projecting edges and extending upwardly at one end to above the water-level, and heating-pipes within the body of the upper portion of the tank.

ROBERT D. MILLER.

Witnesses:
   EDWIN A. MILLER,
   GEORGE W. BOTSFORD.